(12) United States Patent
Okuda et al.

(10) Patent No.: US 12,330,502 B2
(45) Date of Patent: Jun. 17, 2025

(54) VEHICLE

(71) Applicant: TOYOTA JIDOSHA KABUSHIKI KAISHA, Toyota (JP)

(72) Inventors: Tadashi Okuda, Hadano (JP); Shunsuke Fushiki, Susono (JP); Susumu Hashimoto, Ebina (JP); Masato Fujikawa, Susono (JP); Hiroyuki Shioiri, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/376,554

(22) Filed: Oct. 4, 2023

(65) Prior Publication Data

US 2024/0198782 A1    Jun. 20, 2024

(30) Foreign Application Priority Data

Dec. 19, 2022   (JP) ................................. 2022-202230

(51) Int. Cl.
*B60K 6/442* (2007.10)
*B60K 6/36* (2007.10)
*B60K 6/387* (2007.10)

(52) U.S. Cl.
CPC ............... *B60K 6/442* (2013.01); *B60K 6/36* (2013.01); *B60K 6/387* (2013.01)

(58) Field of Classification Search
CPC .................................. B60K 6/36; B60K 6/387
See application file for complete search history.

(56) References Cited

U.S. PATENT DOCUMENTS

| | | | | |
|---|---|---|---|---|
| 3,620,323 A | * | 11/1971 | Maeda | B60K 6/48 475/5 |
| 5,697,466 A | * | 12/1997 | Moroto | B60W 10/08 903/910 |
| 6,340,339 B1 | * | 1/2002 | Tabata | B60K 6/387 475/5 |
| 7,537,534 B2 | * | 5/2009 | Janson | B60K 6/387 475/5 |
| 9,638,292 B1 | * | 5/2017 | Linton | B60K 6/365 |
| 2004/0011576 A1 | * | 1/2004 | Taniguchi | H02K 51/00 903/910 |
| 2004/0176203 A1 | * | 9/2004 | Supina | F16H 3/725 903/910 |
| 2008/0300082 A1 | | 12/2008 | Abe | |

FOREIGN PATENT DOCUMENTS

| | | |
|---|---|---|
| JP | H08-159238 A | 6/1996 |
| JP | 2008-296612 A | 12/2008 |
| JP | 2019-047551 A | 3/2019 |

* cited by examiner

*Primary Examiner* — Ha Dinh Ho
(74) *Attorney, Agent, or Firm* — Oliff PLC

(57) ABSTRACT

A vehicle designed to increase a maximum drive torque transmitted from an engine to drive wheels. The vehicle comprises: an input member to which a torque is delivered from the engine; an output member connected to drive wheels; a reaction mechanism that establishes a reaction torque; and a differential mechanism. A differential mechanism comprises: an input element connected to the input member; an output element connected to the output member; and a reaction element connected to the reaction mechanism. A torque converter is arranged between the input member and the output member.

6 Claims, 5 Drawing Sheets

VEHICLE

CROSS-REFERENCE TO RELATED APPLICATIONS

The present disclosure claims the benefit of Japanese Patent Application No. 2022-202230 filed on Dec. 19, 2022 with the Japanese Patent Office, the disclosures of which are incorporated herein by reference in its entirety.

BACKGROUND

Field of the Disclosure

Embodiments of the present disclosure relate to the art of a vehicle having a reaction mechanism that transmits power generated by an internal combustion engine to an output member.

Discussion of the Related Art

JP-A-2019-47551 describes a hybrid vehicle having a power split mechanism that performs a differential action among a first rotary element to which an engine is connected, a second rotary element to which a motor is connected, and a third rotary element to which a drive wheel is connected. In the hybrid vehicle described in JP-A-2019-47551, the drive torque is transmitted from the engine to the drive wheels via the power split mechanisms by generating the drive torque by the engine while establishing a reaction torque by the motor.

JP-A-H8-159238 describes a vehicle in which a front cover and an intermediate shaft connected to a torque converter are connected to an output shaft of the engine, and the intermediate shaft is connected to an output shaft of the torque converter through a clutch device.

The power split mechanism described in JP-A-2019-47551 is configured to increase the rotational speed of the motor in proportion to an increase in the rotational speed of the motor. That is, when the engine speed is increased to increase the output torque of the engine, the motor speed is increased. On the other hand, the output torque of the motor decreases with an increase in the rotational speed of the motor. Further, the torque is transmitted from the engine to the drive wheels in accordance with the gear ratio of the power split mechanism by establishing the reaction torque by the motor against the torque generated by the engine. For example, in a situation where the vehicle speed is extremely low when launching the vehicle, it is necessary to deliver a relatively large drive torque from the power split mechanism. For this purpose, the output torque of the engine is increased by increasing the engine speed. However, since the rotational speed of the motor is increased by increasing the engine speed, the reaction torque counteracting the output torque of the engine is no longer established by the motor. In this situation, therefore, the output torque of the engine is restricted to a magnitude corresponding to the maximum torque of the motor. In order to solve the above-explained technical problems, it is necessary to increase the maximum driving force to propel the vehicle having the power split mechanism that transmits engine torque to drive wheels by establishing a reaction torque by the motor.

SUMMARY

Aspects of embodiments of the present disclosure have been conceived noting the above-explained technical problems, and it is therefore an object of the present disclosure to provide a vehicle adapted to increase a maximum drive torque transmitted from an internal combustion engine to drive wheels.

According to the exemplary embodiment the present disclosure, there is provided a vehicle comprising: an input member to which a torque is delivered from an internal combustion engine; an output member that is connected to a pair of drive wheels in a torque transmittable manner; a reaction mechanism that establishes a reaction torque; and a differential mechanism comprising an input element that is connected to the input member, an output element that is connected to the output member, and a reaction element that is connected to the reaction mechanism to apply the reaction torque established by the reaction mechanism. In order to achieve the above-explained objective, according to the exemplary embodiment the present disclosure, a torque converter is arranged between the input member and the output member to deliver the torque from the input member to the output member while multiplying the torque.

In a non-limiting embodiment, the torque converter may comprise a pump impeller that is connected to the input member in a torque transmittable manner, and a turbine runner that is connected to the output member. In addition, the vehicle may further comprise a one-way clutch that is interposed between the input member and the pump impeller to interrupt torque transmission between the input member and the pump impeller while the pump impeller is rotated at a speed higher than a rotational speed of the input member.

In a non-limiting embodiment, a clutch device that selectively interrupt torque transmission between the input member and the pump impeller may also be arranged in the vehicle instead of the one-way clutch.

In a non-limiting embodiment, the reaction mechanism may include a generator that translates an output power of the internal combustion engine partially into an electric power by establishing the reaction torque. In addition, the vehicle may further comprise: an electric storage device that is charged with the electric power generated by the generator; and an electric machine to which at least one of the electric power generated by the generator and the electric power accumulated in the electric storage device is supplied to generate a torque. The electric machine may be connected to the output member in a torque transmittable manner.

According to the present disclosure, the internal combustion engine, the reaction mechanism, and the output member are connected to the power split mechanism so that the torque of the internal combustion engine is transmitted to the drive wheels via the power split mechanism and the output member by establishing the reaction torque by the reaction mechanism. In addition, the torque converter is interposed between the input member to which the torque is transmitted from the internal combustion engine and the output member so that the torque is delivered to the output member while being multiplied. Therefore, the torque generated by the internal combustion engine is partially transmitted to the drive wheels via the torque converter, and the remaining torque is transmitted to the drive wheels via the power split mechanism. That is, the torque transmitted to the power split mechanism is reduced as compared with the case where the torque converter is not provided. Therefore, the reaction torque required to transmit the torque delivered to the power split mechanism to the output member can be reduced. That is, the maximum torque of the internal combustion engine can be transmitted to the drive wheels without excess or deficiency.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
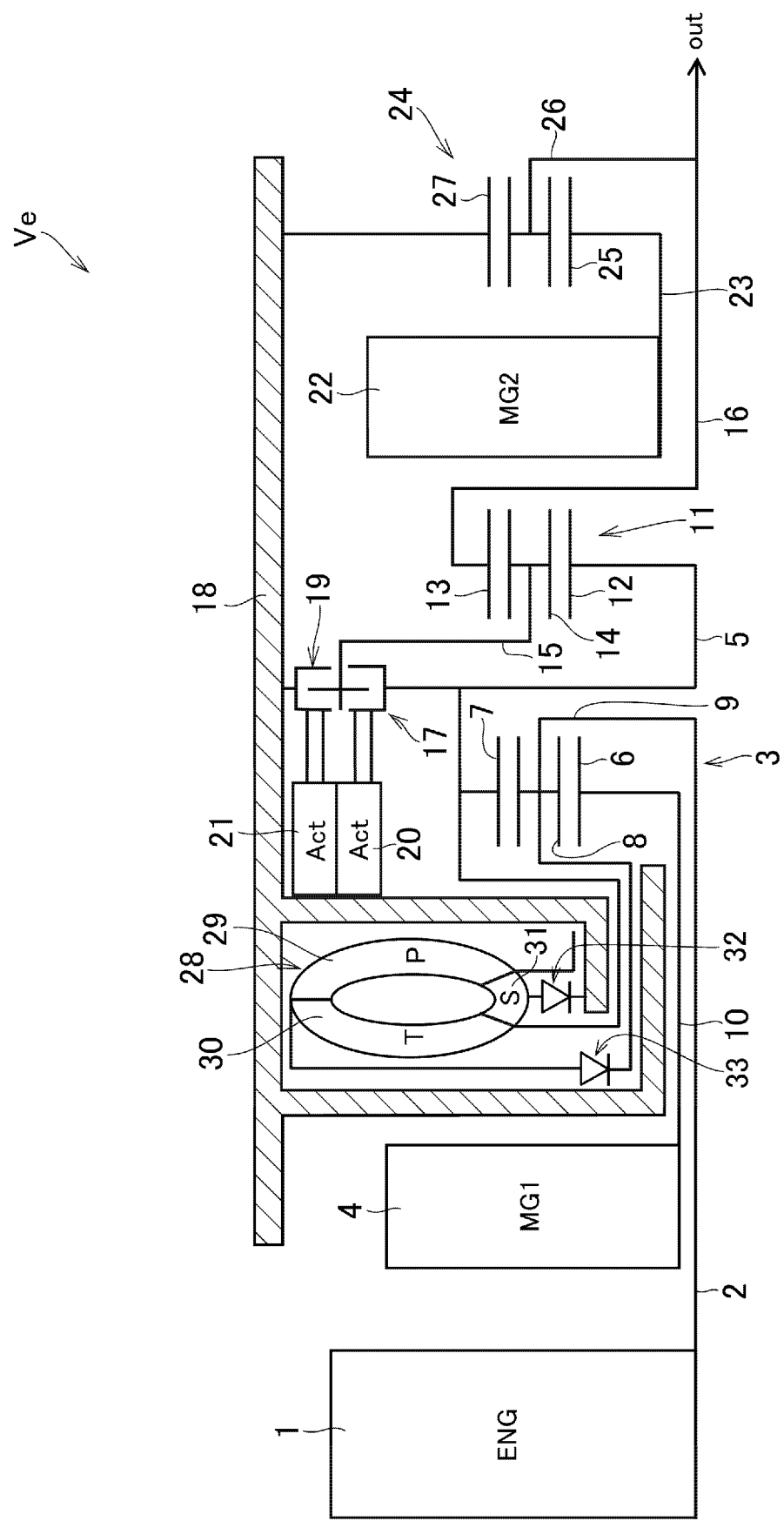
FIG. 1 is a skeleton diagram showing one example of the vehicle according to an embodiment of the present disclosure.

Here will be explained the vehicle according to the exemplary embodiment of the present disclosure with reference to FIG. 1. The vehicle Ve shown in FIG. 1 is a front-engine rear-drive layout vehicle in which power generated by an engine (referred to as ENG in the drawings) 1 arranged in the front section of the vehicle Ve is delivered to a pair of rear wheels (not shown).

The engine 1 is a conventional internal combustion engine, and for example, a gasoline engine, a diesel engine, or the like may be employed as the engine 1. Specifically, the engine 1 generates a driving torque by burning an air/fuel mixture, and a braking torque derived from a friction torque, a pumping loss, or the like by stopping the combustion of the air/fuel mixture.

In order to distribute the torque of the engine 1 to the first motor (referred to as MG1 in the drawings) 4 and an output shaft 5, a power split mechanism 3 is connected to an output shaft 2 of the engine 1. In the example shown in FIG. 1, a single-pinion planetary gear unit is employed as the power split mechanism 3. The power split mechanism 3 comprises a sun gear 6, a ring gear 7 arranged concentrically with the sun gear 6, a plurality of pinion gears 8 meshing with the sun gear 6 and the ring gear 7, and a carrier 9 rotatably supporting the pinion gears 8. In the power split mechanism 3, the carrier 9 is connected to the engine 1, the sun gear 6 is connected to the first motor 4, the ring gear 7 is connected to the output shaft 5, and the output shaft 5 is also connected to a pair of rear wheels as drive wheels to transmit the torque thereto. Accordingly, in the embodiment of the present disclosure, the output shaft 2 of the engine 1 serves as the "input member", the output shaft 5 of the power split mechanism 3 serves as the "output member", the carrier 9 serves as the "input element", the sun gear 6 serves as the "reaction element", and the ring gear 7 serves as the "output element".

As the first motor 4, a motor arranged in the conventional hybrid vehicles may be employed. In the example shown in FIG. 1, a motor generator is employed as the first motor 4. Specifically, the first motor 4 is operated as a motor to generate a drive torque by supplying electric power thereto, and operated as a generator to generate electric power by rotating the motor 4 passively by the sun gear 6. For example, a permanent magnet synchronous motor in which permanent magnets are arranged in a rotor, an induction motor or the like may be employed as the first motor 4. In the example shown in FIG. 1, the first motor 4 is arranged in series with the engine 1, and the output shaft 2 of the engine 1 penetrates through a hollow output shaft 10 of the first motor 4. The first motor 4 is electrically connected to an electric storage device (not shown). Therefore, electric power is supplied from the electric storage device to the first motor 4, and the electric storage device is charged with electric power generated by the first motor 4. In the embodiment of the present disclosure, the first motor 4 serves as a "reaction mechanism" and a "generator".

A reversing mechanism 11 as a single-pinion planetary gear unit is connected to the output shaft 5 of the power split mechanism 3 so as to selectively reverse a rotational direction of the output shaft 5. The reversing mechanism 11 comprises a ring gear 13 arranged concentrically with a sun gear 12, a plurality of pinion gears 14 meshing with the sun gear 12 and the ring gear 13, and a carrier 15 rotatably supporting the pinion gears 14. In the reversing mechanism 11, the sun gear 12 is connected to the output shaft 5, the ring gear 13 is connected to an output shaft 16 of the reversing mechanism 11, and the carrier 15 is selectively connected to the sun gear 12 through a forward clutch 17. A power transmission unit formed of the power split mechanism 3 and the reversing mechanism 11 is accommodated in a case 18, and the ring gear 13 is selectively connected to the case 18 through a reverse clutch (brake) 19.

That is, the rotary elements of the reversing mechanism 11 are rotated integrally by engaging the forward clutch 17. As a result, the torque transmitted to the reversing mechanism 11 is further transmitted to the output shaft 16 without changing a direction and a magnitude thereof. Whereas, by engaging the reverse clutch 19, the rotational directions of the sun gear 12 and the ring gear 13 are reversed, and rotational speeds of those gears are changed in accordance with a gear ratio of the reversing mechanism 11. As a result, the torque transmitted to the reversing mechanism 11 is reversed while being multiplied, and further transmitted to the output shaft 16.

For example, a frictional engagement device may be employed as the forward clutch 17 and the reverse clutch 19, and the forward clutch 17 and the reverse clutch 19 may be actuated by dedicated actuators (referred to as Act in the drawings) 20 and 21 such as a hydraulic actuator or an electromagnetic actuator.

Power generated by a second motor (referred to as MG2 in the drawings) 22 as the "electric motor" of the embodiment of the present disclosure may be applied to the output shaft 16 of the reversing mechanism 11. For this purpose, in the example shown in FIG. 1, the second motor 22 is mounted on the output shaft 16 of the reversing mechanism 11, and a cylindrical output shaft 23 of the second motor 22 is connected to the output shaft 16 of the reversing mechanism 11 through a speed reducing mechanism 24.

As the first motor 4, a motor generator may also be employed as the second motor 22. Specifically, the second motor 22 is operated as a motor to generate a drive torque by supplying electric power thereto, and operated as a generator to generate electric power by rotating the second motor 22 passively. For example, a permanent magnet synchronous motor in which permanent magnets are arranged in a rotor, an induction motor or the like may also be employed as the second motor 22. The second motor 22 is also electrically connected to the aforementioned electric storage device. Therefore, the second motor 22 generates power when the electric power is supplied thereto from the electric storage device, and the electric storage device is charged by the electric power generated by the second motor 22. Since the first motor 4 and the second motor 22 are electrically connected to each other, the electric power generated by one of the motors 4 (or 22) may be supplied to the other one of the motors 22 (or 4) without passing through the electric storage device. Thus, the electric power may be supplied to the second motor 22 not only from the electric storage device but also from the first motor 4. In the example illustrated in FIG. 1, the second motor 22 is disposed between the reversing mechanism 11 and the speed reducing mechanism 24.

As the speed reducing mechanism 24 shown in FIG. 1, a single pinion planetary gear mechanism may also be employed. In the speed reducing mechanism 24, a sun gear 25 is connected to the second motor 22, a carrier 26 is connected to the output shaft 16 of the reversing mechanism 11, and the ring gear 27 is connected to the case 18.

The torque delivered to the power split mechanism 3 from the engine 1 may be transmitted to the output shaft 5 by establishing a reaction torque by the first motor 4. Specifically, given that the reaction torque established by the first motor 4 is $(\rho/(1+\rho))$Tin, a torque expressed as $1/(1+\rho)$ Tin is transmitted to the output shaft 5. In the above expressions, Tin is an input torque to the power split mechanism 3, and $\rho$ is a gear ratio obtained by dividing the number of teeth of the sun gear 6 by the number of teeth of the ring gear 7. That is, $\rho$ is a fixed value governed by the structure of the power split mechanism 3.

For example, given that the torque generated by the first motor 4 is greater than the aforementioned reaction torque, the rotational speed of the engine 1 is reduced by the power split mechanism 3. By contrast, given that the torque generated by the first motor 4 is smaller than the aforementioned reaction torque, the rotational speed of the engine 1 is increased by the power split mechanism 3. That is, if the reaction torque of the first motor 4 is insufficient, the torque will not be transmitted sufficiently to the output shaft 5.

As the conventional engines, the maximum torque of the engine 1 increases with an increase in a rotational speed of the engine 1. On the other hand, the maximum torque of the first motor 4 is constant until a rotational speed thereof is increased to a predetermined speed (base speed). However, in a speed range higher than the predetermined speed, the maximum torque of the first motor 4 decreases with an increase in the rotational speed thereof due to back electromotive force. For example, when launching the vehicle Ve or when the speed of the vehicle Ve is extremely low, the rotational speed of the first motor 4 increases with an increase in the rotational speed of the engine 1. If a relatively large driving force is required in this situation, the rotational speed of the engine 1 is increased to increase the output torque of the engine 1. As a result, the rotational speed of the first motor 4 is increased, and hence the reaction torque of the first motor 4 would be insufficient. That is, when launching the vehicle Ve or when the speed of the vehicle Ve is extremely low, the output torque of the engine 1 would be restricted depending on the maximum torque of the first motor 4.

As shown in FIG. 1, in order to reduce the torque transmitted from the engine 1 to the drive wheels via the power split mechanism 3, the vehicle Ve is provided with a torque converter 28 connected to the carrier 9 and the ring gear 7. As a torque converter arranged in the conventional vehicles, the torque converter 28 comprises a pump impeller (referred to as P in the drawings) 29, a turbine runner (referred to as T in the drawings) 30, and a stator (referred to as S in the drawings) 31.

Since the pump impeller 29 is connected to the carrier 9, the pump impeller 29 is rotated by the torque transmitted from the carrier 9 to create a flow of hydraulic oil in the torque converter 28. On the other hand, the turbine runner 30 opposed to the pump impeller 29 is connected to the ring gear 7. In order to alter a direction of the flow of the hydraulic oil created by the pump impeller 29, the stator 31 is interposed between the pump impeller 29 and the turbine runner 30, and the stator 31 is fixed to the case 18 through the one-way clutch 32.

For example, given that the carrier 9 is rotated at a speed lower than a rotational speed of the ring gear 7, the torque of the carrier 9 is transmitted to the ring gear 7 while being multiplied in accordance with the ratio between the rotational speeds (or torques) of those rotary elements. That is, in this case, the torque of the engine 1 is partially transmitted to the output shaft 5 via the torque converter 28, and a residual torque is delivered to the power split mechanism 3. As a result, the torque delivered to the power split mechanism 3 is reduced, and hence the restriction of the transmission torque due to the shortage of the reaction torque of the first motor 4 may be avoided.

When the ring gear 7 (i.e., the turbine runner 30) is rotated at a speed higher than a rotational speed of the carrier 9 (i.e., the pump impeller 29), a power loss would result from a rotation of the torque converter 28. Therefore, in the example shown in FIG. 1, a one-way clutch 33 is interposed between the pump impeller 29 and the carrier 9.

Figure 2:
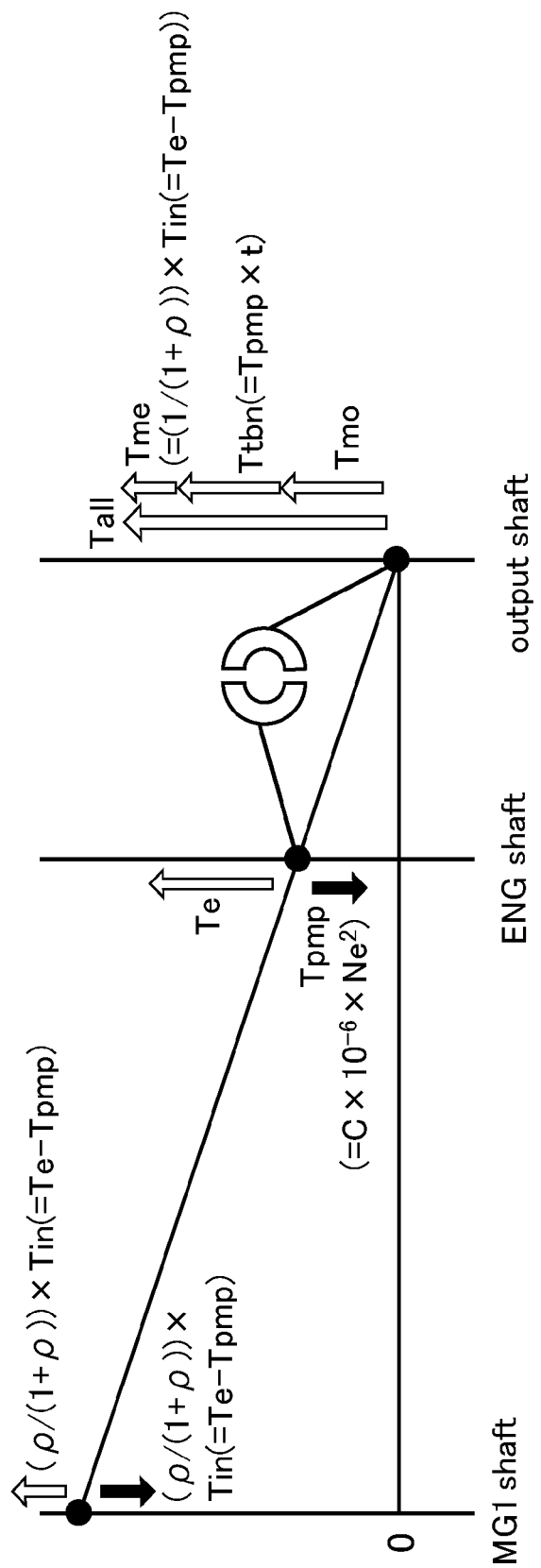
FIG. 2 is a nomographic diagram showing an operational state of the power split mechanism when launching the vehicle.

FIG. 2 shows rotational speeds of the output shaft 2 of the engine 1 (referred to as ENG shaft in FIG. 2), the output shaft 10 of the first motor 4 (referred to as MG1 shaft in FIG. 2), and the output shaft 5 of the power split mechanism 3 (referred to as output shaft in FIG. 2), and torques of those shafts when launching the vehicle Ve. As indicated in FIG. 2, the rotational speed of the output shaft 5 of the power split mechanism 3 (hereinafter, referred to as the output speed) when launching the vehicle Ve is 0. In this situation, given that the output shaft 2 of the engine 1 rotates at a predetermined speed Ne, the output shaft 10 of the first motor 4 rotates at a speed expressed as $((1+\rho)/\rho)$ Ne (hereinafter, referred to as the motor speed).

In the situation shown in FIG. 2, the torque Te of the engine 1 (hereinafter, referred to as the engine torque) is partially delivered to the torque converter 28. The torque Tpmp thus delivered to the torque converter 28 (hereinafter referred to as the T/C absorbing torque) may be calculated on the basis of a torque capacity coefficient C governed by the structure of the torque converter 28 and the engine speed Ne (that is, the speed of the pump impeller 29). Specifically, the T/C absorbing torque Tpmp may be expressed as $Tpmp = C \cdot 10^{-6} \cdot Ne^2$.

In this situation, a residual torque calculated by subtracting the T/C absorbing torque Tpmp from the engine torque Te is delivered to the power split mechanism 3 as the aforementioned input torque Tin(=Te−Tpmp). Consequently, a torque expressed as $(\rho/(1+\rho)) \cdot (Te-Tpmp)$ is delivered to the output shaft 10 of the first motor 4, and a reaction torque counteracting the torque of the output shaft 10 is established by the first motor 4.

As a result, to the output shaft 5, a torque Ttbn (hereinafter, referred to as the turbine torque) is delivered via the torque converter 28, and a torque Tme (hereinafter, referred to as the mechanical torque) is delivered via the power split mechanism 3. In this situation, if the electric power generated by the first motor 4 or the electric power stored in the electric storage device is supplied to the second motor 22, an output torque Tmo of the second motor 22 (hereinafter, referred to as the motor torque) is applied to the output shaft 16 of the reversing mechanism 11. In the situation where the vehicle Ve shown in FIG. 1 is propelled in the forward direction, the torque is transmitted to the output shaft 16 without being changed in its magnitude by the reversing mechanism 11, and the output shaft 5 and the output shaft 16 are substantially rotated integrally. Therefore, the motor torque Tmo is indicated on the axis representing the output shaft in FIG. 2.

Specifically, the turbine torque Ttbn may be calculated by multiplying: a torque ratio t governed by a speed ratio of the torque converter 28 calculated by dividing the output speed therefrom by the input speed thereto; by the T/C absorbing torque Tpmp (Ttbn=Tpmp×t). On the other hand, the mechanical torque Tme is governed by the input torque Tin to the power split mechanism 3 and the gear ratio ρ, as expressed as $(1/(1+\rho)) \cdot (Te-Tpmp)$.

Figure 3:
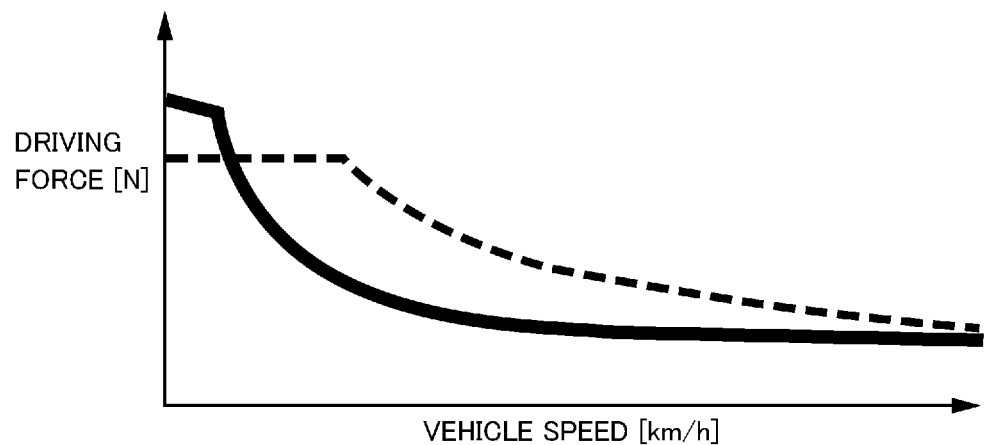
FIG. 3 is a comparison diagram of the maximum driving force with respect to a speed of the vehicle having the torque converter and the maximum driving force with respect to a speed of the vehicle without having the torque converter.

FIG. 3 shows a relationship between the vehicle speed and the maximum driving force. In FIG. 3, the horizontal axis represents the vehicle speed, the vertical axis represents the driving force, the solid curve represents the maximum driving force of the vehicle Ve shown in FIG. 1 in which the torque is transmitted from the carrier 9 to the ring gear 7 via the torque converter 28, and the dashed curve represents the maximum driving force of the vehicle without having the torque converter 28.

As described above, in the vehicle Ve having the torque converter 28, the torque is transmitted from the engine 1 to the output shaft 5 via the torque converter 28 in accordance with the torque capacity coefficient C of the torque converter 28, and the residual torque is transmitted to the output shaft 5 via the power split mechanism 3. That is, the input torque Tin to the power split mechanism 3 is reduced as compared with the input torque to the power split mechanism 3 in the vehicle without having the torque converter 28. Therefore, the reaction torque of the first motor 4 required to transmit the torque delivered to the power split mechanism 3 to the output shaft 5 may be reduced. In other words, the torque transmitted to the output shaft 5 via the power split mechanism 3 is not restricted by the reaction torque of the first motor 4. Therefore, during propulsion at a low speed, the maximum output torque of the engine 1 may be transmitted to the drive wheels without restriction. For this reason, as indicated in FIG. 3, the maximum driving force for propelling the vehicle Ve may be increased as compared to the vehicle without having the torque converter 28.

Figure 4:
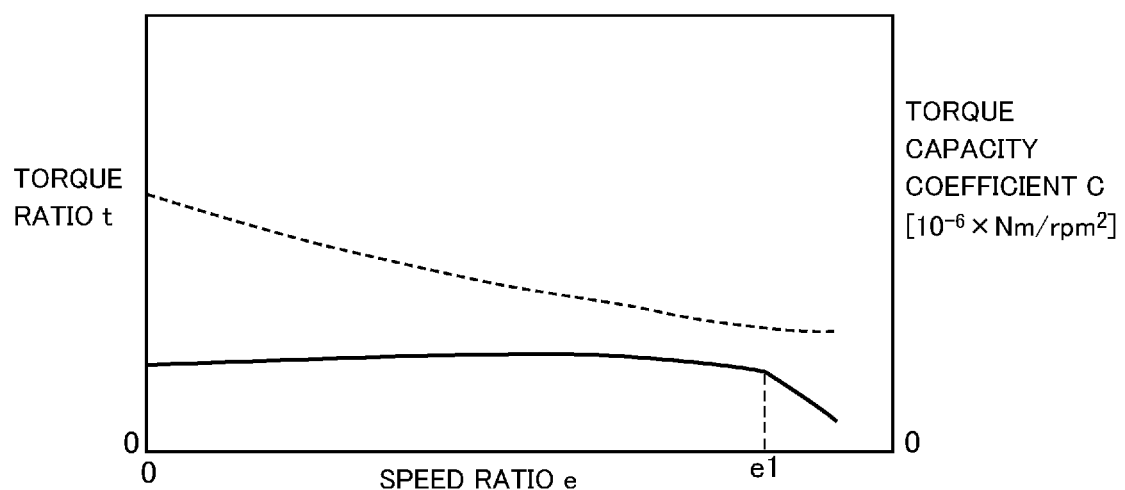
FIG. 4 is a graph showing characteristics of a torque converter.

As indicated by the broken curve in FIG. 4, the torque ratio t of the torque converter 28 decreases with an increase in the speed ratio e. Whereas, given that the speed ratio e is less than the predetermined ratio e1, the torque capacity coefficient C of the torque converter 28 is substantially constant as indicated by the solid curve. Further, as indicated by the solid curve in FIG. 5, the maximum torque of the engine 1 increases with an increase in the speed of the engine 1.

Figure 5:
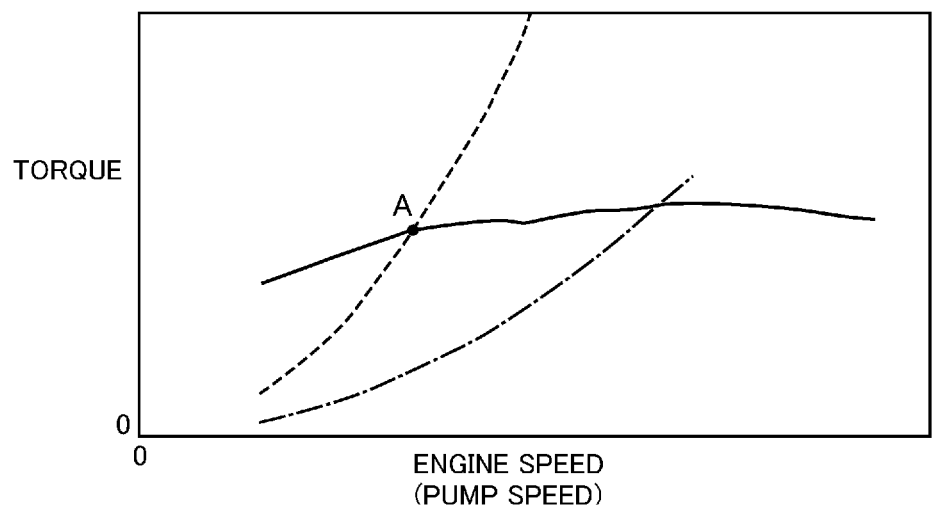
FIG. 5 is a graph showing a relationship between the engine speed and the maximum engine torque, and a relationship between the engine speed and a T/C absorbing torque.

In FIG. 5, the dashed curve represents the T/C absorbing torque Tpmp of a case in which the speed ratio e is smaller than the predetermined ratio e1, and the dashed-dotted curve represents the T/C absorbing torque Tpmp of a case in which the speed ratio e is greater than the predetermined ratio e1. As indicated in FIG. 4, the torque capacity coefficient C varies in accordance with the speed ratio e. Therefore, as indicated in FIG. 5, a magnitude of the T/C absorbing torque Tpmp is changed depending on the speed ratio e.

As described, the T/C absorbing torque Tpmp increases with the square of the input speed (that is, the engine speed). On the other hand, the torque capacity coefficient C and the speed ratio e are maintained substantially constant in the condition in which the speed ratio e is less than the predetermined ratio e1. Therefore, when the vehicle Ve is propelled at a relatively low speed, the speed of the engine 1 may not be increased higher than the speed at the intersection A shown in FIG. 5 between the maximum torque of the engine 1 and the T/C absorbing torque Tpmp. That is, the maximum power of the engine 1 is maintained substantially constant until the speed ratio e is increased to the predetermined ratio e1 or greater. Consequently, as shown in FIG. 3, the maximum driving force of the vehicle Ve is reduced in a speed range higher than the predetermined speed, as compared with that of the vehicle without having the torque converter 28.

Figure 6:
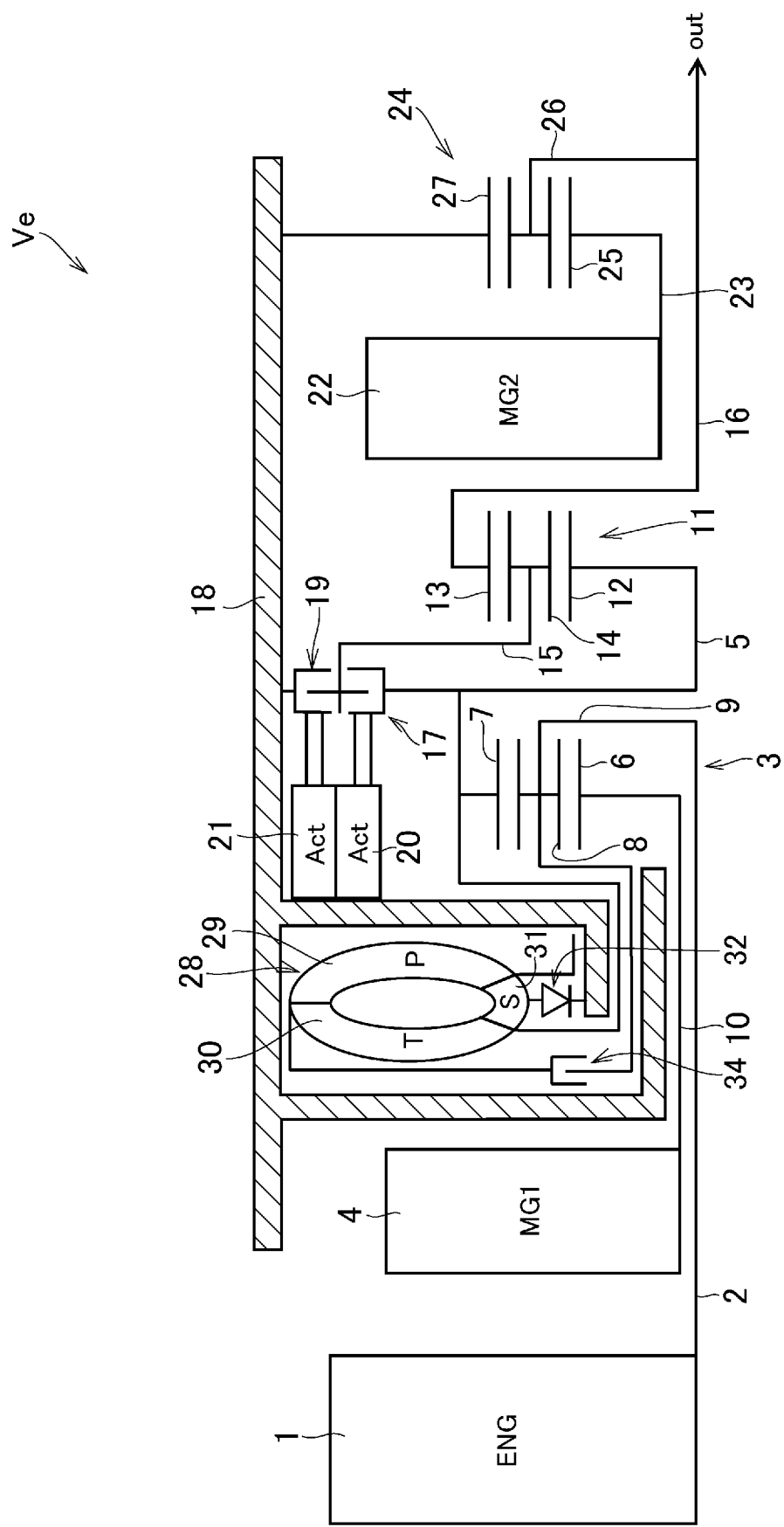
FIG. 6 is a skeleton diagram showing another example of the vehicle according to the embodiment of the present disclosure in which a clutch device is arranged in place of the one-way clutch.

In order to avoid such reduction in the maximum driving force, as shown in FIG. 6, a clutch device 34 that is selectively engaged and disengaged to transmit torque and to interrupt torque transmission may be employed instead of the one-way clutch 33. Specifically, in the clutch device 34, one of rotary members is connected to the carrier 9, and the other one of rotary members is connected to the pump impeller 29. In order to engage the clutch device 34 in a situation where the carrier 9 and the pump impeller 29 are rotated relatively to each other, it is preferable to employ a friction clutch device as the clutch device 34. Further, as shown in FIG. 3, the range where the maximum driving force is smaller than that of the vehicle without having the torque converter 28 is relatively large. Therefore, the clutch device 34 is disengaged frequently, and the clutch device 34 is disengaged for a long time. For these reasons, it is more preferable to employ a so-called normal open clutch device as the clutch device 34. In this case, the clutch device 34 is engaged by applying hydraulic pressure or electric power thereto, and disengaged by cancelling the application of hydraulic pressure or electric power thereto. Note that the configuration of the vehicle Ve shown in FIG. 6 is similar to that of the vehicle Ve shown in FIG. 1 except for the clutch device 34 employed instead of the one-way clutch 33.

In the vehicle Ve provided with the clutch device 34, the operating mode of the vehicle Ve may be switched between a mode in which torque is transmitted from the engine 1 to the drive wheels via the torque converter 28 at a speed lower than the predetermined vehicle speed, and a mode in which torque is transmitted from the engine 1 to the drive wheels via the power split mechanism 3 without passing through the torque converter 28 at a speed equal to or higher than the predetermined vehicle speed. Therefore, it is possible to avoid the restriction of the output power of the engine 1 due to the restriction of the speed of engine 1 by the T/C absorbing torque Tpmp. That is, it is possible to avoid the restriction of the maximal driving force of the vehicle Ve.

In addition, it is possible to increase a generation amount of the first motor 4 by disengaging the clutch device 34 to deliver the output power of the engine 1 entirely to the power split mechanism 3. As a result, the electric power generated by the first motor 4 may be supplied to the second motor 22 in addition to the electric power supplied from the electric storage device. Therefore, the output torque of the second motor 22 may be increased, and the output power of the drive system of the vehicle Ve may be increased as much as possible.

Note that the vehicle according to the embodiment of the present disclosure is not limited to the above-explained embodiment, and may be modified arbitrarily according to need. For example, as the differential mechanism, a double pinion planetary gear unit may also be employed instead of the single pinion planetary gear unit shown in FIGS. 1 and 6. In addition, the second motor 22 may also be connected to the front wheels instead of the rear wheels to which torque is delivered from the engine 1.

What is claimed is:

1. A vehicle comprising:
   an input member that is an output shaft of an internal combustion engine;
   an output member that is connected to a pair of drive wheels in a torque transmittable manner;
   a reaction mechanism that establishes a reaction torque; and
   a differential mechanism comprising
     an input element that is connected to the output shaft,
     an output element that is connected to the output member, and
     a reaction element that is connected to the reaction mechanism to apply the reaction torque established by the reaction mechanism; and
   a torque converter including a pump impeller connected to the output shaft and a turbine runner connected to the output element, that is arranged between the input member and the output member to deliver the torque from the input member to the output element while multiplying the torque.

2. The vehicle as claimed in claim 1,
   the vehicle further comprises a one-way clutch that is interposed between the output shaft and the pump impeller to interrupt torque transmission between the output shaft and the pump impeller while the pump impeller is rotated at a speed higher than a rotational speed of the output shaft.

3. The vehicle as claimed in claim 1,
   the vehicle further comprises a clutch device that selectively interrupt torque transmission between the output shaft and the pump impeller.

4. The vehicle as claimed in claim 1,
   wherein the reaction mechanism includes a generator that translates an output power of the internal combustion engine partially into an electric power by establishing the reaction torque,
   the vehicle further comprises:
   an electric storage device that is charged with the electric power generated by the generator; and
   an electric machine to which at least one of the electric power generated by the generator and the electric power accumulated in the electric storage device is supplied to generate a torque, and
   the electric machine is connected to the output member in a torque transmittable manner.

5. The vehicle as claimed in claim 2,
   wherein the reaction mechanism includes a generator that translates an output power of the internal combustion engine partially into an electric power by establishing the reaction torque,
   the vehicle further comprises:
   an electric storage device that is charged with the electric power generated by the generator; and
   an electric machine to which at least one of the electric power generated by the generator and the electric power accumulated in the electric storage device is supplied to generate a torque, and
   the electric machine is connected to the output member in a torque transmittable manner.

6. The vehicle as claimed in claim 3,
   wherein the reaction mechanism includes a generator that translates an output power of the internal combustion engine partially into an electric power by establishing the reaction torque,
   the vehicle further comprises:
   an electric storage device that is charged with the electric power generated by the generator; and
   an electric machine to which at least one of the electric power generated by the generator and the electric power accumulated in the electric storage device is supplied to generate a torque, and
   the electric machine is connected to the output member in a torque transmittable manner.

* * * * *